United States Patent
Tene et al.

(10) Patent No.: US 7,552,302 B1
(45) Date of Patent: Jun. 23, 2009

(54) ORDERING OPERATION

(75) Inventors: Gil Tene, Los Altos Hills, CA (US); Kevin Normoyle, Santa Clara, CA (US); Jack Choquette, Mountain View, CA (US); David Kruckernyer, Vancouver (CA); Cliff N. Click, Jr., San Jose, CA (US)

(73) Assignee: Azul Systems, Inc., Mountain View, CA (US)

( * ) Notice: Subject to any disclaimer, the term of this patent is extended or adjusted under 35 U.S.C. 154(b) by 203 days.

(21) Appl. No.: 11/227,448

(22) Filed: Sep. 14, 2005

Related U.S. Application Data

(60) Provisional application No. 60/610,028, filed on Sep. 14, 2004.

(51) Int. Cl.
*G06F 12/02* (2006.01)

(52) U.S. Cl. .................................................. 711/167
(58) Field of Classification Search .................. 711/159
See application file for complete search history.

(56) References Cited

U.S. PATENT DOCUMENTS 6,085,263 A * 7/2000 Sharma et al. ................. 710/56
7,167,559 B2 * 1/2007 Ono et al. ...................... 380/28

\* cited by examiner

*Primary Examiner*—Hyung S Sough
*Assistant Examiner*—Hamdy S Ahmed
(74) *Attorney, Agent, or Firm*—Van Pelt, Yi & James LLP

(57) ABSTRACT

Executing an ordering operation is disclosed. A store operation associated with storing a value into a portion of a memory is initiated. An ordering operation to ensure that the store operation, but not necessarily all store operations, are completed is executed.

31 Claims, 5 Drawing Sheets

201 Assign A

202 CLZ past A

203 Store 0 A

204 Fence St St

205 A ← 2+2

206 Assign B

207 CLZ past B

208 Store 0 B

209 Fence St St

ORDERING OPERATION

CROSS REFERENCE TO OTHER APPLICATIONS

This application claims priority to U.S. Provisional Patent Application No. 60/610,028 entitled VIRTUAL MACHINE filed Sep. 14, 2004, which is incorporated herein by reference for all purposes.

BACKGROUND OF THE INVENTION

Before a memory space is made usable to a processor, the memory space is often initialized to an initial value. For example, when an object is dynamically allocated in an object oriented programming language, the default values of the object may be set to zero. Initializing the memory space to an initial value can be an expensive process. Since the initialized memory space is often not in the cache of a processor, storing the initial value to the memory space creates a cache miss in all levels of the cache. The current value of the memory space is obtained from main memory only to be replaced with the new initial value. Since cache misses consume a large number of clock cycles, storing the initial value can waste valuable clock cycles as the processor waits to execute the next instruction that is often dependent upon the completion of the initial value store. In multi-processor systems, other processor caches may be caching an old value of the initialized memory space. Cache coherence invalidations must be sent to the other caches to invalidate the old cache values before the new initial value can be stored. This may add even more wasted clock cycles. Therefore, there exists a need to more efficiently manage execution during memory space initialization.

BRIEF DESCRIPTION OF THE DRAWINGS

Various embodiments of the invention are disclosed in the following detailed description and the accompanying drawings.

FIG. 2 is an example of a operation sequence. At line 201, unallocated object A is assigned a memory space.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Initializing values in one or more memory space is disclosed. In some embodiments, when a memory space is allocated, an initial value is stored beyond the currently allocated memory space. This allows a subsequent memory allocation to allocate memory with already stored initial values while storing an initial value for the next memory allocation past the newly allocated memory. The initial values are stored in the cache directly without cache misses by not obtaining old values from main memory. By separating initial value storage and allocation to at least some memory space, the initial value is stored before the memory space is assigned and subsequently used. After memory is assigned during allocation, a process is able to use the memory without waiting for an initial value to be stored since the initial value has been already stored by a previous allocation. To ensure that the previous allocation operation has completed the initial value store, an ordering operation is performed.

Figure 1A:
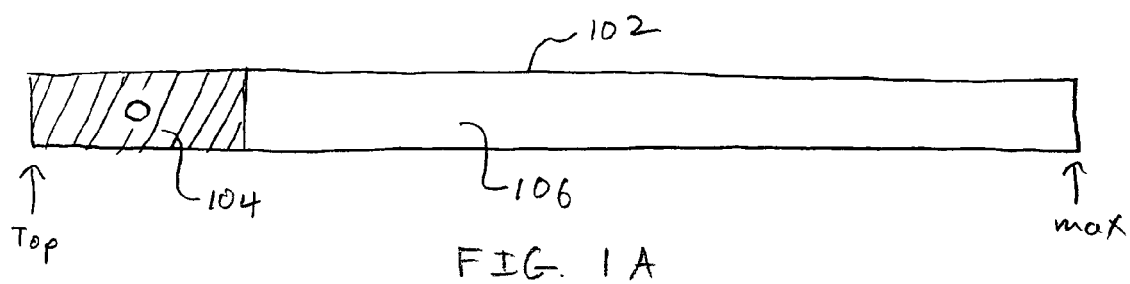
FIG. 1A illustrates an embodiment of allocate-able memory before allocation.

FIG. 1A illustrates an embodiment of allocate-able memory before allocation. Box 102 represents allocate-able memory. In some embodiments the allocate-able memory is heap memory. The top pointer of memory 102 points to the beginning of allocate-able memory. The max pointer of memory 102 points to the end of allocate-able memory. At least some allocate-able memory is stored with an initial value before any memory is allocated from the allocate-able memory. Shaded area 104 of memory 102 is a memory area with the initial value stored in unallocated memory space. The initial value may be any value. In the example shown, the initial value is zero. Any amount of memory may be stored with an initial value. The initial value and the amount of memory stored may be preconfigured or dynamically configured. In some embodiments, an initial value is not stored before memory is allocated. The first memory allocation stores its own initial value and stores at least some initial value for the next allocation past its allocation area. Area 106 of memory 102 is unallocated memory that has not been stored with an initial value.

When memory is allocated from the allocate-able memory 102, at least some memory is allocated from at least a portion of shaded area 104. Allocated memory may include heap memory allocated during dynamic allocation. For example, memory allocated during a "new" operator execution in JAVA, C++, or C# programming language may be associated with the allocated memory. Since at least a portion of the allocated area has been stored with the initial value, at least a portion of the allocated area does not have to be initialized to an initial value. The latency to subsequent operations needing the initial value stored memory is shortened. The allocation may include assigning memory space to an object and storing an initial value at a distance past the assigned/allocated memory. The amount of initial value stored memory past the allocated memory may be preconfigured or dynamically configured. The distance past the current allocated/assigned memory at which an amount of initial values is stored may be preconfigured or dynamically configured. The distance may be zero. A fixed amount of memory may be stored with an initial value at some distance past the last allocated memory or past the last initial value memory during each allocation instance. In some embodiments, the same amount of memory allocated in each allocation instance is initialized with an initial value during each allocation instance. Each allocation instance may be any size. If the allocation instance size is larger than the initial value pre-stored area size, the amount of memory pre-stored with an initial value may be made larger in subsequent allocation instances. In some embodiments, storing an initial value to a memory area includes storing an initial value in the cache without retrieving the contents associated with the memory area from main memory. In multiprocessor systems, data associated with the memory area to contain the initial value may be invalidated in other processor caches.

Figure 1B:
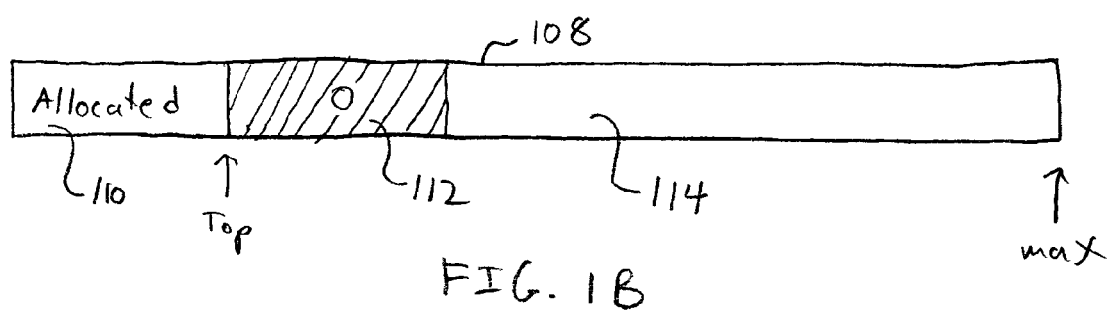
FIG. 1B illustrates an embodiment of allocate-able memory after at least one allocation.

FIG. 1B illustrates an embodiment of allocate-able memory after at least one allocation. In some embodiments, FIG. 1B illustrates an embodiment of allocate-able memory after at least one allocation operation associated with memory 102 of FIG. 1A. Box 108 represents allocate-able memory. The top pointer of memory 108 points to the end of allocated memory and the beginning of subsequent memory allocation. The max pointer of memory 108 points to the end of allocate-able memory. Memory area 110 of memory 108 holds allocated memory. Shaded area 112 of memory 108 is memory area with the initial value pre-stored beyond the allocated memory space. The initial value may be any value. In the example shown, the initial value is zero. Any amount of memory may be stored with an initial value. The initial value and the amount of memory stored may be preconfigured or dynamically configured. Area 114 of memory 108 is unallocated memory that has not been stored with an initial value.

A program execution includes an ordered sequence of instructions. Program order includes the sequential execution order of instructions that appear in a program. An instruction may perform computation, modify control flow, or generate memory accesses. The memory access may include of one or more operations. Visibility order includes the order in which memory operations become visible to processes. A load instruction results in a read operation that returns a read value from a particular memory address. In some embodiments, a read operation becomes visible to a process when another process cannot alter the read value returned by the load with a write operation to the same address. A store instruction results in a write operation that generates a write value to particular memory address. In some embodiments, a write operation becomes visible to another process when the other process performs a read operation to the same address, and the read operation returns the value of the write operation. Although loads and stores to a same address may be configured complete in an order that matches a single-processor program order, the program order of memory instructions executed by a single process may not constrain the visibility order of all memory accesses by all processes in a system.

A fence operation may force a visibility order based on the program order and divides accesses and their subsequent operations into prior and future operations with respect to the fence operation in program order. The fence operation may specify a visibility order in any combination of prior and future load and stores. For example, a prior/future fence may include one or more of the following: a store/store fence, a store/load fence, a store/(load and store) fence, a load/load fence, a load/store fence, a load/(load and store) fence, a (load and store)/load fence, a (load and store)/store fence, and a (load and store)/(load and store) fence. A store/store fence may cause all prior stores to become visible before any future stores but allow loads to become visible in any order with respect to the fence instruction. The fence operation establishes global visibility of the prior operations specified by the instruction. Future operations specified by the instruction may not be made visible until prior operations specified in the instruction have been made globally visible. In some embodiments a fence operation is a "membar" operation.

In some embodiments to ensure that a previous allocation operation has completed the initial value store for a memory space to be allocated, an ordering operation is performed. A general fence operation fences all stores and/or loads. If a general fence operation was used to ensure that a previous allocation operation has completed the initial value store for a memory space to be allocated in an allocation operation, both the previous allocation initial value store and the new initial value store associated with the allocation operation would be fenced. To allow only specific initial value stores to be fenced, initial value stores may not be responsive to a general fence operation. For example, a store/store fence operation causes all prior non initial value stores to become visible before any future non initial value stores but allows initial value stores to become visible in any order with respect to the fence instruction.

If memory accesses to a same memory address are configured to be ordered in program order, the ordering operation to ensure that a previous allocation operation has completed the initial value store for a memory space to be allocated may include a memory access instruction and a non initial value store responsive fence instruction. For example, to ensure that a previous allocation operation has completed the initial value store for a memory space to be allocated, the memory space to be allocated can be accessed using a non initial store operation, and the access operation can be fenced. If the previous allocation operation initial value store has completed, the cost of accessing the memory space will be low since the memory space will be already in the cache. In some embodiments, a initial value store fence operation exists. The initial value fence operation causes all prior initial value stores to become visible before any future stores and/or loads. The special initial value fence operation may be used during a process context switch.

In some embodiments to ensure that a previous allocation operation has completed the initial value store for a memory space to be allocated, a memory address range specific fence is used. For example, the address specific fence causes only prior loads and/or stores to a specified address range to become visible before any future loads and/or stores. By specifying a memory address range associated with the previous allocation initial value store operation, completion of the initial value store can be ensured. The memory address range may be a single address. Other non initial value store responsive fence operations may exist.

FIG. 2 is an example of a operation sequence. At line 201, unallocated object A is assigned a memory space. A prior operation should have initiated an initial value store for at least a portion of the memory space to be assigned to object A. At line 202, an initial value is stored beyond ending address of object A. CLZ (cache line zero) operation stores the initial value (zero) in the cache without obtaining non-cached contents of the memory space to contain the initial value. In multi-processor systems, CLZ operation may cause invalidation of lines in other processor caches associated with the memory to contain the initial value. The amount of memory used to store the initial value may be specified together with the CLZ operation, preconfigured, and/or dynamically determined. At line 203, a zero is stored to object A as a marking operation to ensure that a previous operation has completed storing the initial value for at least a portion of memory space assigned to object A. At line 204, a store/store fence operation ensures that the marking operation of line 203 has completed. The fence operation does not fence CLZ operation of line 202. The fence operation fences the store to object A, and as a result the fence orders the previous CLZ operations on addresses of object A. In this example, the fence operation of line 204 and the store operation of line 203 together constitute an ordering operation. After the fence instruction of 204, object A is made visible to other processes. At line 205 a processing and store operation is performed to object A. Due to the fence operation of line 204, any future store operation, including operation of line 205, must be ordered such that it is made visible only after any store operation that precedes the fence instruction. At line 206, unallocated object B is assigned a memory space. Since the memory assignment of B is an immediately subsequent assignment after assignment of object A, the memory space assigned to object B may include at least a part of the memory space stored with the initial value by CLZ operation of line 202. At line 207, an initial value (zero) is stored beyond the ending memory address of object B. At line 208, a zero is stored to object B as a marking operation to ensure that previous CLZ operations to any address in the memory space being assigned to object B have completed storing an initial value. These previous CLZ operations may include the CLZ of line 202, and/or earlier CLZ operations. At line 209, a store/store fence operation ensures that the marking operation of line 203 will have completed ahead of future store operations. At line 210 a processing and store operation is performed to object B. Due to the fence operation of line 209, any future store operation, including operation of line 210, must be ordered after fence instruction of line 209. In some embodiments an allocation operation performs an assignment operation, a CLZ operation, and an ordering operation.

Figure 3:
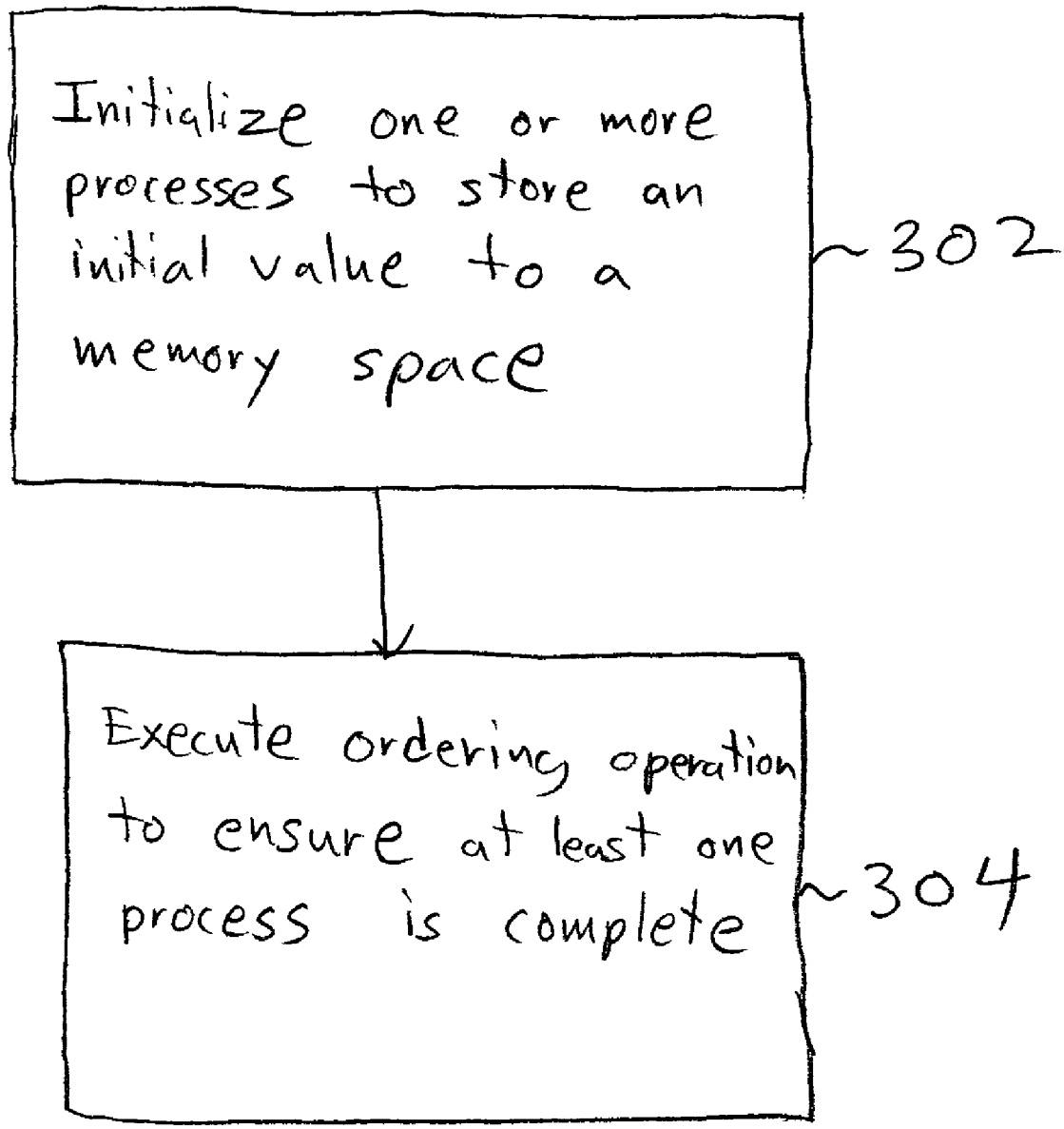
FIG. 3 is a flow chart illustrating an embodiment of a process for initializing a value in a memory space.

FIG. 3 is a flow chart illustrating an embodiment of a process for initializing a value in a memory space. This process may be implemented on software or hardware, including a processor, a program process, a thread, an instruction, a virtual machine, an interpreter, and a complier. At 302, one or more processes to store an initial value to a memory space are initialized. Initializing may include starting execution of one or more operations that are associated with storing an initial value to a memory space. In some embodiments, the process to store the initial value includes executing one or more initial value store specific processor instructions. At 304, an ordering operation is executed to ensure at least one process to store an initial value to a memory space is complete. The ordering operation may include one or more of the following: a fencing operation, an address specific fencing operation, a non initial value store responsive fencing operation, an only initial value store responsive fencing operation, and a memory access operation. In some embodiments, the ordering operation includes one or more initial value store ordering specific processor instructions.

Figure 4:
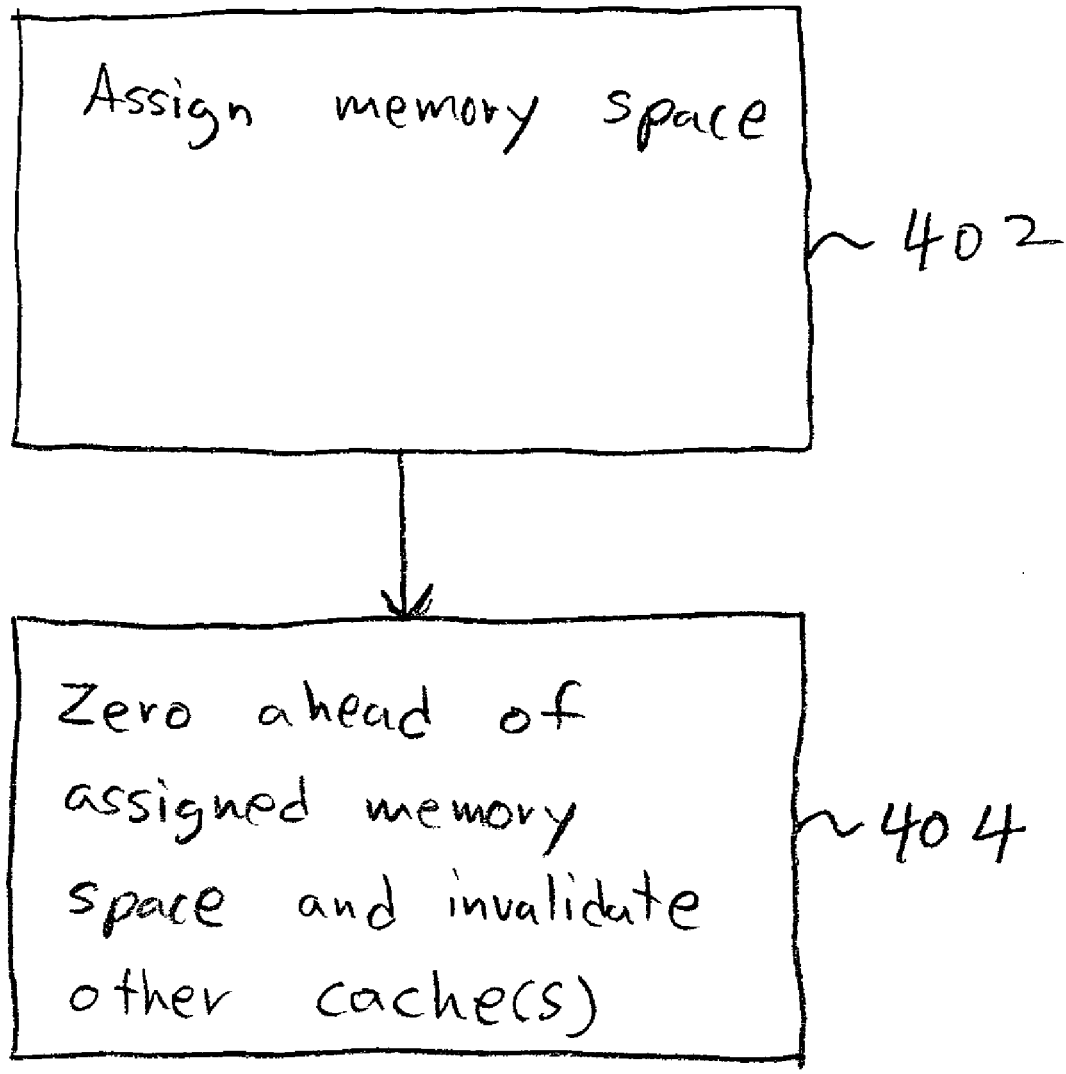
FIG. 4 is flow chart illustrating an embodiment of a process for allocating memory.

FIG. 4 is flow chart illustrating an embodiment of a process for allocating memory. In some embodiments, the process of FIG. 4 is included in 302 of FIG. 3. At 402, memory space is assigned to a newly allocated object. In some embodiments, the assigned memory space includes at least some memory space associated with a previously started operation to store an initial value the memory space. At 404, memory beyond the last assigned memory space is stored with an initial value of zero, and data in other processor caches associated with the memory to contain the initial value is invalidated. The zeroing operation may not be responsive a general fence operation. The invalidation may be generated explicitly or generated automatically by a coherence scheme.

Figure 5:
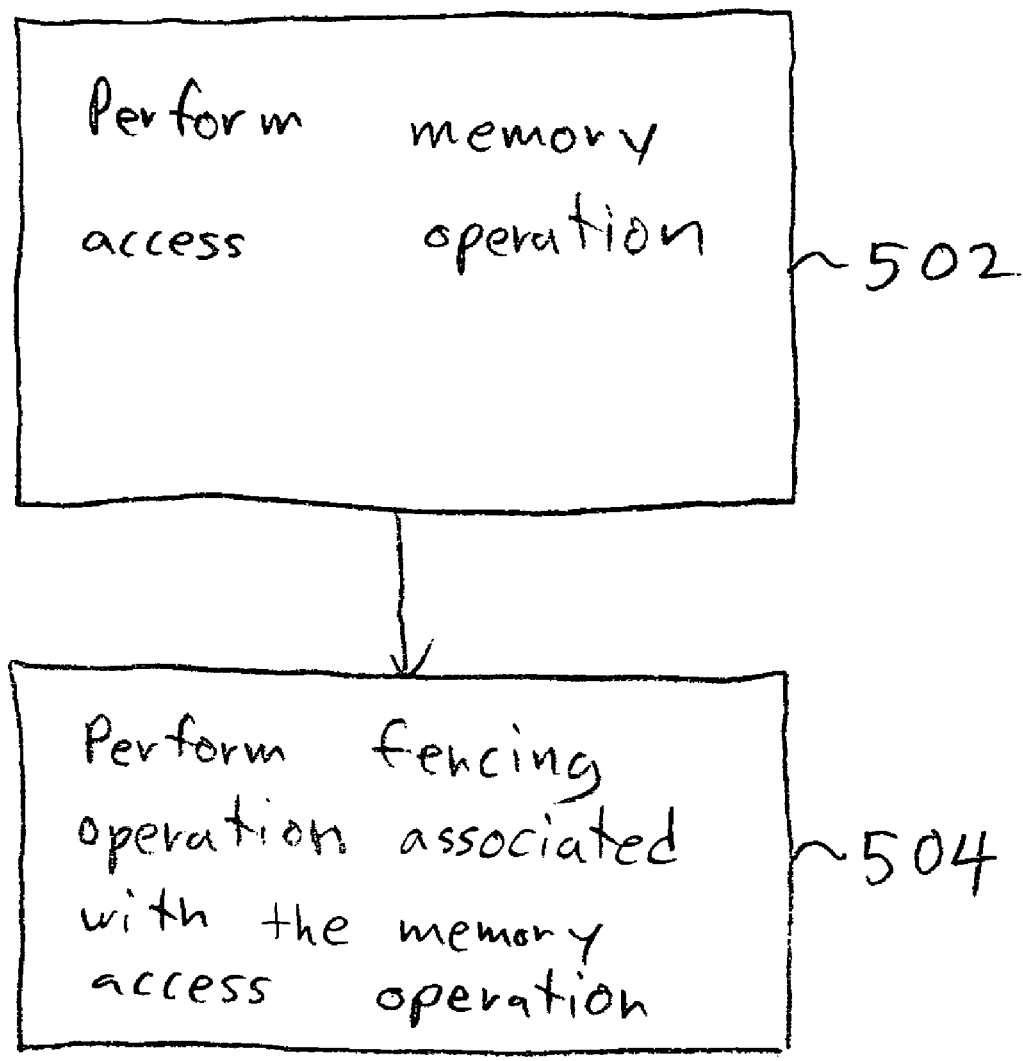
FIG. 5 is a flow chart illustrating an embodiment of a process for performing an ordering operation.

FIG. 5 is a flow chart illustrating an embodiment of a process for performing an ordering operation. In some embodiments, the process of FIG. 5 is included in 304 of FIG. 3. At 502, memory access operations are performed on a memory area associated with the ordering operation. The memory access operations may be store or load operations. The memory access operations may be operations with no store or load side effect. At 502, a fencing operation associated with the memory access operations is performed. The fencing operation ensures the memory access operations are executed before any future load and/or store operation is executed. The fencing operation may not fence initial value stores.

A processor instruction set may include one or more instructions associated with storing an initial value in a memory space. The instruction may have any number of operands. In some embodiments, the instruction has no operands. One or more of the following may be specified by an operand, preconfigured, and/or dynamically determined: an initial value, a memory location to store the initial value, and an amount of memory used to store the initial value The instruction may store the initial value directly to a cache without incurring cache misses even if the memory space is not in the cache.

A processor instruction set may include one or more specific fencing instructions. A fencing instruction may have any number of operands. The operands to a fencing instruction may specify the type of fence to be performed. The operands to a fencing instruction may specify the addresses or address range to perform the fence on. In some embodiments, the instruction has no operands. A fencing instruction may guarantee before and after ordering of loads and/or stores except initial value stores. For example, a fencing instruction may perform store/store fencing but not fence initial value stores. A fencing instruction may fence initial value stores and not fence other stores and/or loads. A fencing instruction may fence a combination of stores, loads, and initial value stores. A fencing instruction may fence only memory access instructions to a specified memory address. For example, a fencing instruction orders a memory access instruction to a specific memory address before any future loads and/or stores. In some embodiments the memory address is specified by an associated identifier with in an instruction operand. In other embodiments, the specified memory address instruction is preconfigured and/or dynamically determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of executing operations, including:
   executing a memory allocation operation, including:
   allocating a first memory space; and
   initiating a store operation associated with storing an initialization value into a portion of a memory that is at a distance beyond the first allocated memory space;

executing an ordering operation to ensure that the store operation, but not necessarily all store operations, is completed at least prior to next memory allocation operation; and executing the next memory allocation operation, including:

allocating a second memory space, the second memory space including at least a part of the portion of the memory that stores the initialization value.

2. A method as recited in claim 1, wherein the allocated first memory space is associated with a memory object.

3. A method as recited in claim 1, wherein the store operation is a different type of store operation from one or more other store operations not ensured to be ordered by the ordering operation.

4. A method as recited in claim 1, wherein the store operation is associated with a cache invalidation of the portions of the memory cached in one or more processor caches.

5. A method as recited in claim 1, wherein the store operation is not responsive to a fencing operation that fences non-initial-value-stores.

6. A method as recited in claim 1, wherein the store operation includes storing the initial value to a cache without incurring a cache miss even if the portion of the memory is not cached.

7. A method as recited in claim 1, wherein memory size of the portion of the memory is preconfigured or dynamically configured.

8. A method as recited in claim 1, wherein the portion of the memory includes unallocated memory.

9. A method as recited in claim 1, wherein the ordering operation includes a memory access operation and a fencing operation responsive to the memory access operation.

10. A method as recited in claim 9, wherein the fencing operation is not responsive to the store of one or more initial values.

11. A method as recited in claim 9, wherein the store operation completes only if the memory access instruction will not produce a cache miss.

12. A method as recited in claim 1, wherein the ordering operation includes performing a load or a store operation to the portion of the memory.

13. A method as recited in claim 1, wherein the ordering operation includes an address range specific fencing operation.

14. A method as recited in claim 13, wherein the address range specific fencing operation causes only prior stores or loads associated with a specific memory address range to become visible before any future stores or loads become visible.

15. A method as recited in claim 1, wherein at least a portion of the memory is heap memory.

16. A method as recited in claim 1, wherein the method is implemented on one of the following: a processor, a program process, a thread, a processor instruction, a virtual machine, an interpreter, and a compiler.

17. A method as recited in claim 1, further comprising executing a second ordering operation to ensure that all store operations are completed.

18. A method as recited in claim 1, wherein the ordering operation includes a fencing operation responsive to all stores of initial values but not responsive to other types of stores or loads.

19. A method as recited in claim 1, wherein executing the next memory allocation operation further includes initiating a second store operation associated with storing the initialization value into a second portion of the memory that is beyond the second allocated memory space.

20. A system for executing operations, including:

a memory; and a processor coupled to the memory, configured to:

execute a memory allocation operation, including to:

allocate a first memory space; and initiate a store operation associated with storing an initialization value into a portion of the memory that is at a distance beyond the first allocated memory space;

execute an ordering operation to ensure that the store operation, but not necessarily all store operations, is completed at least prior to next memory allocation operation; and execute the next memory allocation operation including to:

allocate a second memory space, the second memory space including at least a part of the portion of the memory that stores the initialization value.

21. A system as recited in claim 20, wherein the allocated memory space is associated with a memory object.

22. A system as recited in claim 20, wherein the store operation is a different type of store operation from one or more other store operations not ensured to be ordered by the ordering operation.

23. A system as recited in claim 20, wherein the processor initiates the store operation associated with storing the value into the portion of the memory including by executing an initial value store processor instruction.

24. A system as recited in claim 23, wherein the initial value store processor instruction includes one or more of the following operands: an initial value operand, a memory location operand associated with the location to store the initial value, and a size operand associated with the amount of memory used to contain the initial value.

25. A system as recited in claim 20, wherein the processor executes the ordering operation including by executing one of the following fencing instructions: a fencing instruction not responsive to the store of one or more initial values, an address range specific fencing instruction, and a fencing instruction responsive to all stores of initial values but not responsive to other types of stores or loads.

26. A system as recited in claim 20, wherein the store operation is associated with a cache invalidation of the portions of the memory cached in caches coupled to other processors.

27. A system as recited in claim 20, wherein the store operation includes storing one or more initial values to a cache without incurring a cache miss even if the portions of the memory is not cached.

28. A system as recited in claim 20, wherein the ordering operation includes a memory access operation and a fencing operation responsive to the memory access operation.

29. A system as recited in claim 20, wherein the ordering operation includes an address range specific fencing operation.

30. A system as recited in claim 20, wherein to execute the next memory allocation operation further includes to initiate a second store operation associated with storing the initialization value into a second portion of the memory that is beyond the second allocated memory space.

31. A computer program product for executing operations, the computer program product being embodied in a computer readable storage medium and comprising computer instructions for:
executing a memory allocation operation, including:
allocating a first memory space; and
initiating a store operation associated with storing an initialization value into a portion of a memory that is at a distance beyond the first allocated memory space;
executing an ordering operation to ensure that the store operation, but not necessarily all store operations, is completed at least prior to next memory allocation operation; and
executing the next memory allocation operation, including:
allocating a second memory space, the second memory space including at least a part of the portion of the memory that stores the initialization value.

* * * * *